Oct. 14, 1941.  A. W. FARRALL ET AL  2,258,645

METHOD AND APPARATUS FOR MIXING EDIBLE MATERIALS

Filed July 2, 1938  4 Sheets-Sheet 1

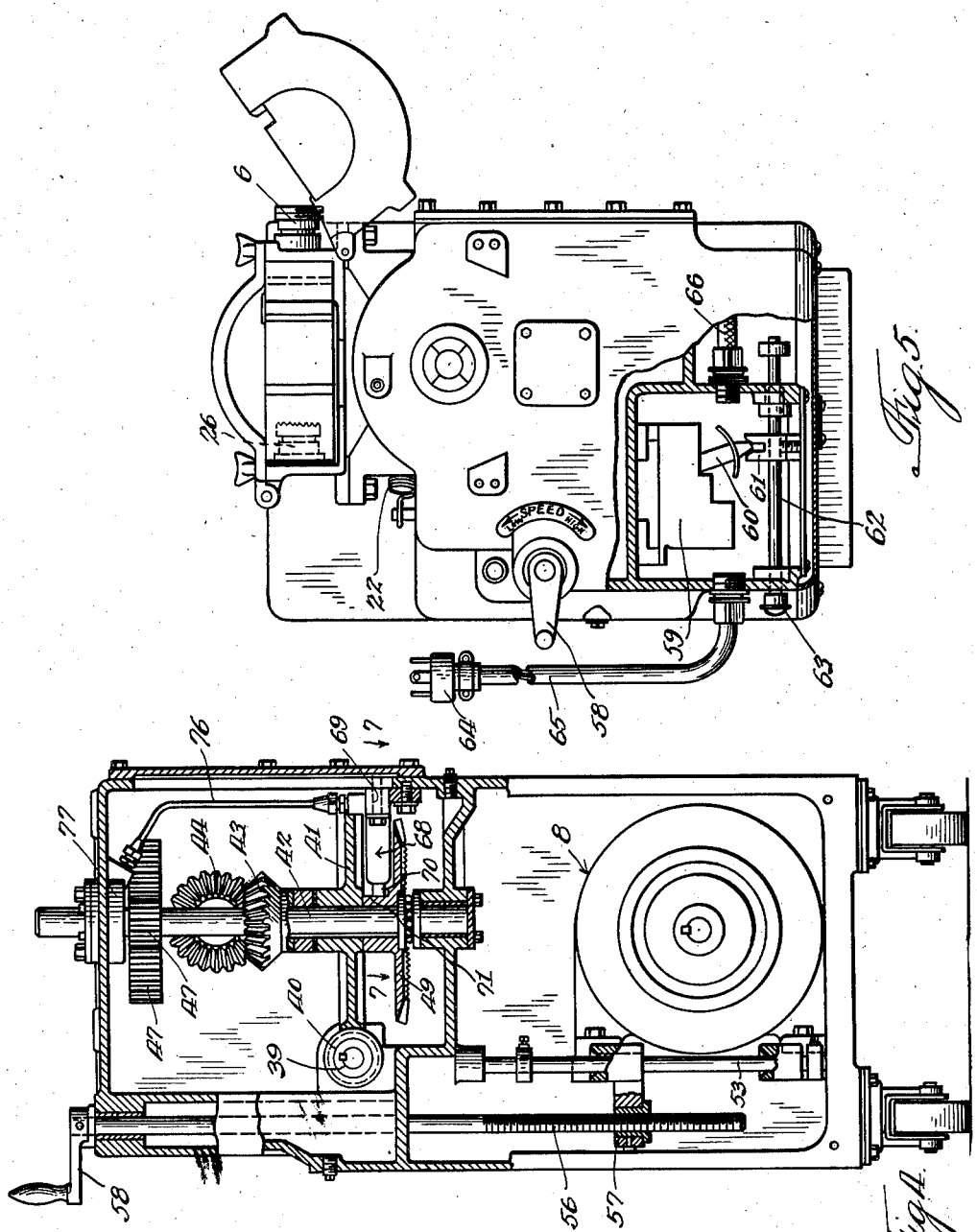

Patented Oct. 14, 1941

2,258,645

UNITED STATES PATENT OFFICE 2,258,645

METHOD AND APPARATUS FOR MIXING EDIBLE MATERIALS

Arthur W. Farrall, Wilmette, and Rodney L. Hanson, Chicago, Ill., assignors to The Creamery Package Mfg. Company, Chicago, Ill., a corporation of Illinois Application July 2, 1938, Serial No. 217,188

22 Claims. (Cl. 107—54)

Our invention relates to apparatus for mixing edible materials. More specifically, it relates to apparatus for mixing separable edible bodies, such as fruits, candies, nuts, and the like, with plastic edible material, such as ice cream, and the like.

One of the objects of our invention is to provide apparatus of this character in which the edible bodies will be uniformly distributed with respect to the plastic edible material.

A further object of our invention is to provide such apparatus which will be capable of use with ice cream freezers of the "continuous" type.

A further object of our invention is to provide such an apparatus which does not necessitate the bringing together of the edible bodies with respect to the plastic material while the plastic material is flowing under pressure.

A further object is to provide apparatus as indicated above in which, after bringing together the plastic material and edible bodies while under atmospheric pressure, the two materials may be fed together into a mixing chamber where they may be mixed and stirred and delivered to a discharge outlet under pressure.

Further objects and advantages of the invention will appear from the description and claims.

In the drawings, in which an embodiment of our invention is shown,

Fig. 4 is an elevational view taken from the right of Fig. 1, parts being broken away and parts being shown in section;

Fig. 5 is a plan view;

Fig. 6 is a detail plan view showing the fruit feeding rotor;

Fig. 7 is a detail, horizontal, sectional view substantially on the line 7—7 of Fig. 4, showing the oil pump; and Fig. 8 is a section on the line 8—8 of Fig. 7.

Figure 1:
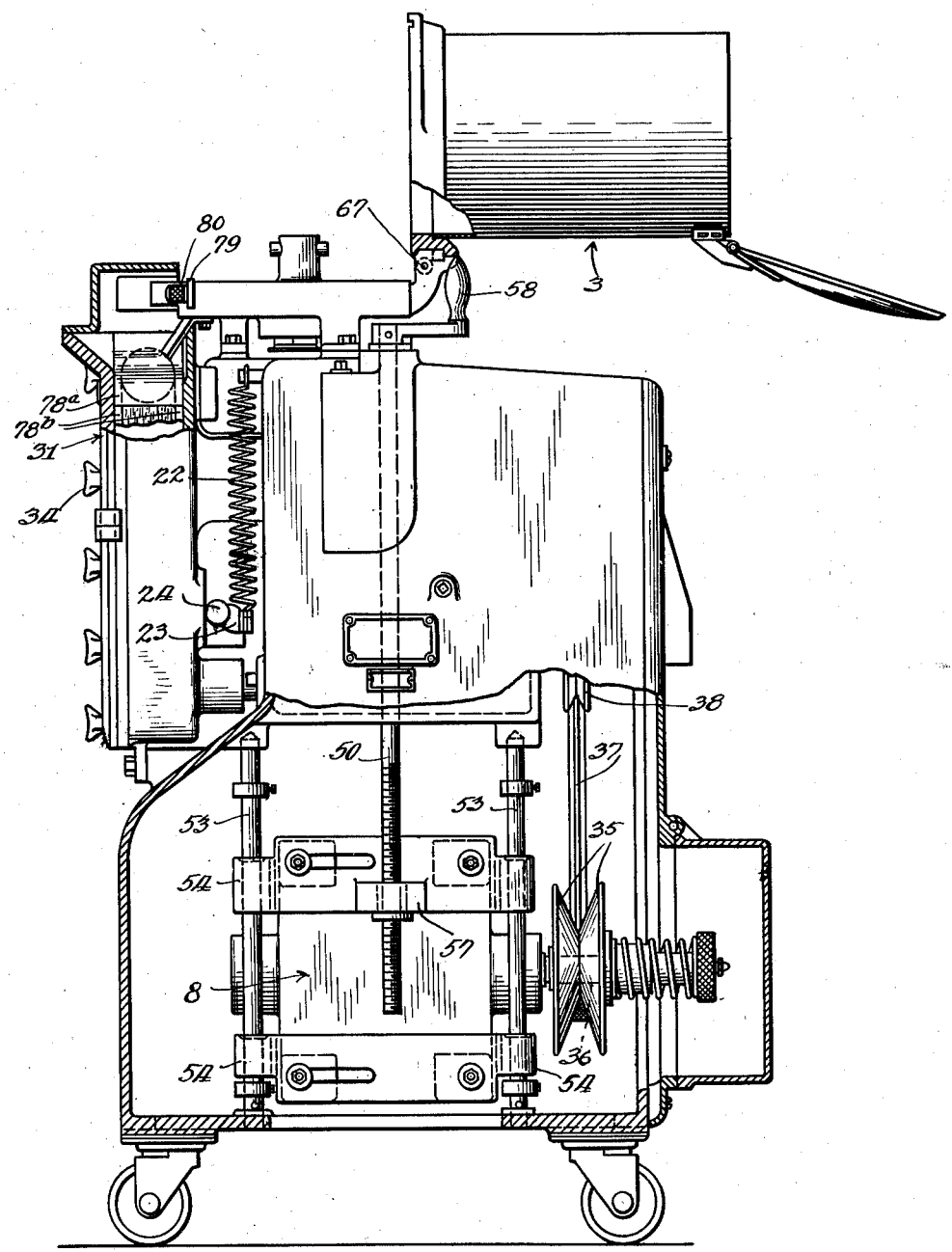
Figure 1 is an elevational view, parts being broken away to show the interior construction.

Referring to the drawings in detail, the construction shown comprises a feed rotor 1 rotatable in the direction of the arrow A (Fig. 6) about a substantially vertical axis having a plurality of circumferentially spaced peripherally opening pockets 2 for measuring out and delivering charges of the separable bodies, such as fruit or nuts, a reservoir or hopper 3 for supplying the edible bodies to the pockets in this rotor 1, a second collecting rotor 4 rotatable in the direction of the arrow B (Fig. 2) about a substantially horizontal axis having circumferentially spaced peripherally opening pockets 5 to which the first rotor 1 delivers charges of the edible bodies as the rotors are rotated, means 6 for supplying a ribbon of plastic material, such as ice cream, to the periphery of the second rotor 4 as the rotor revolves, means 7 for stirring and mixing together the mixture of edible bodies and plastic edible material after they have been discharged from the second rotor 4, an electric motor 8, and transmission from the electric motor to the rotors 1 and 4 and to the stirrer 7. It will be noted that the line of flow of the ribbon of plastic edible material is substantially tangential to the circle of travel of the pockets 5. In general, the volumetric displacement of the pockets 5 is adjusted by speed of the rotor so as to be at least somewhat in excess of the volume of the ribbon of plastic material supplied.

The fruit measuring and feeding rotor 1 is located underneath the hopper 3 so that as the rotor revolves, the fruit falls down from the hopper into the pockets 2 through an arcuate opening 9 (Fig. 6) in the bottom of the hopper 3. As the rotor 1 revolves, the pockets 2 filled with fruit or the like pass underneath the bottom cut-off plate 10 of the hopper, carrying the pockets full of fruit underneath this cut-off plate, the rotation of the rotor being in the direction of the arrow shown in Fig. 6. The fruit in the pocket is scraped out of the pocket as the rotor revolves by means of a hook-like scraper 11 having a scraper edge 12 which is spring-pressed against the undulating periphery of the rotor 1 by means of a coil tension spring 13, this hook-like scraper being pivotally mounted at 14. In order to control the amount of fruit which will be scraped out of each pocket, an adjusting screw 15 is provided, threaded into the hook-like scraper and having its point 16 bearing against an abutment portion on the hopper bottom. This screw 15 may be adjusted so that the scraping edge of the scraper will not reach to the bottom of the pocket in the rotor as the rotor revolves so that the pocket will not be scraped out clean but some fruit will be left in the pocket. By suitable adjustment of this screw 15, the amount discharged from the pockets may be varied. The material scraped out from the pockets by the scraper falls down a chute 17 (Figs. 2 and 3) into the peripheral pockets 5 in the collecting feed wheel. As the collecting feed wheel revolves, it brings the fruit-containing pockets into position to receive the end of the ribbon 18 of ice cream or the like. The shearing edge 17a of the feed wheel cuts a slice off the front end of the ribbon 18 and feeds it along with the fruit in the pocket into the chamber underneath the collecting feed wheel 4. The fruit and ice cream are scraped out of the pockets in the rotor 4 by means of a hook-like scraper 19 similar to the scraper 11 shown in Fig. 6. This scraper is mounted on a rock shaft 20. The scraping edge 21 of the scraper is pressed into scraping engagement with the undulating peripheral edge of the rotor 4 by means of a coil tension spring 22 secured to an arm 23 mounted on the rock shaft 20 on which the scraper is mounted. A suitable manually operable handle 24 extends from the spring-actuated arm 23 to enable the operator to relieve the pressure on the scraper so that the machine may be dismantled readily when desired. It will be seen that the fruit and ice cream are collected under atmospheric pressure and brought together in the pockets of the rotor 4, which facilitates the later stirring together of the two materials without mutilating or injuring the fruit. If the mixture of fruit and ice cream has to be delivered from the mixing chamber 25 to the outlet 26 under pressure so as to cause it to flow through a conduit, this can be effected because of the fact that the rotor 4 forces the fruit and ice cream into the chamber 25, which is in effect sealed by means of the scraping edge 21, so that as the rotor 4 feeds the mixture into this chamber 25, it will cause material to be forced out of the chamber through the outlet opening 26.

In order to thoroughly agitate and commingle the ice cream and fruit in the chamber 25, the stirring rotor 7 is provided having a number of radially extending stirring arms 27. In order to stir the fruit in the hopper 3 and insure that it will fall down from the hopper 3 into the pockets in the fruit feeding rotor 1, a stirring arm 28 is provided (Figs. 3 and 6), secured to an upwardly extending pin 29 on the rotor by means of a pin 30 extending through the stirring arm 28 and pin 29. As this stirring arm 28 revolves, it will agitate the fruit in the hopper 3 and insure that it will be loose and free to flow down into the pockets 2 in the rotor 1.

So as to provide access to the mixing rotor 4 and stirrer 7, when desired, a door or cover 31 is provided, connected to the rotor casing 32 by means of hinges 33, and having suitable clamping screws 34 by means of which the door 31 may be tightly clamped against the rotor housing 32 when in use.

The transmission from the motor 8 to the feed rotor 4 comprises a pair of friction pulleys 35 mounted on the motor shaft 36, a belt 37 running over these pulleys, a pulley 38 over which the belt runs, a shaft 39 (Fig. 4) on which this pulley is mounted, a worm 40 mounted on this shaft, a worm wheel 41 driven from this worm, a shaft 42 on which the worm wheel is mounted, a bevel gear 43 mounted on this shaft 42, and a bevel gear 44 meshing with this bevel gear 43 and mounted on the shaft 45 on which the mixing rotor 4 is mounted.

The transmission from the shaft 42 to the fruit feeding rotor 1 comprises a pinion 46 mounted on this shaft, a gear 47 meshing with this pinion, and a shaft 48 on which this gear is mounted and on which shaft the fruit feeding rotor 1 also is mounted.

The transmission from the shaft 42 to the stirrer 7 comprises a bevel gear 49 mounted on the shaft 42 and a bevel pinion 50 meshing with this gear and mounted on a shaft 51 which drives the shaft 52 on which the stirring rotor is mounted.

In order to vary the speed ratio between the motor 8 and the driven parts, the motor is made vertically adjustable by the provision of vertical guides 53 extending through sleeves 54 on the base of the motor. By adjusting the motor up or down, the friction pulleys 35 will be caused to recede or approach because of their engagement with the belt 37 which acts as a wedge to force the friction wheels 35 apart as the motor is lowered, thus lessening the effective radius of the drive pulleys. These two pulleys are urged toward each other by means of a coil compression spring 55 surrounding the motor shaft 36 in a manner well understood in the variable speed transmission art.

For effecting the up-and-down movement of the motor to change the speed ratio a vertical feed screw 56 is provided, held against longitudinal movement and having a screw threaded engagement with an arm 57 extending from the motor base. This feed screw may be operated by means of a crank 58 secured to the upper end thereof. The electric motor 8 is controlled by a switch 59 (Fig. 5) having a rocker arm 60 actuated by means of a shifter yoke 61 on a slide 62 provided with an operating handle 63. Leads from the line to the switch 59 are supplied by a connector member 64 and cable 65. The cable 66 leads from the switch to the motor. In order to provide access to the fruit feeding rotor 1 when desired, the hopper 3 is pivotally mounted on the base plate at 67 and can be rocked to the position shown in Fig. 1.

In order to insure a supply of oil to the transmission an oil pump 68 is provided (Figs. 4, 7, and 8), secured to the housing by bolts 69 and having a plunger 70 operated by a cam 71 formed on the hub of the bevel gear 49. The plunger 70 is held in contact with the cam by means of a coil compression spring 72. An oil level is maintained in the casing high enough to supply oil to the inlet port 73 of the valve. As the plunger 70 operates, the cam 71 allows the spring 72 to expand to cause the plunger 70 to draw oil in through the inlet port 73 past the check valve 74, and the cam 71 then drives the plunger 70 inwardly to force oil out past the check valve 75 into the supply conduit 76 leading to an oil chamber 77 (Figs. 3 and 4) at the upper end of the casing. From this oil chamber 77 oil is supplied to the two vertical shafts 42 and 48 and finds its way to the gear teeth of the gears 46 and 47, to the shaft 45, and to the gears 44 and 43.

In operation, the hopper 3 is filled with fruit or the like, ice cream or the like is supplied to the ribbon discharge device 6, the motor 8 is put in operation to rotate the feed wheels 1 and 4 and the stirrer 7, the motor 8 being adjusted by means of the crank 58 to give the desired peripheral speed of the rotor 4. As the rotor 1 revolves, it delivers measured charges of fruit to the chute 17, from which it falls into the pockets 5 of the rotor 4. As the rotor 4 revolves, it brings the fruit-containing pockets 5 into position to receive the ribbon 18 of plastic material. The shearing edges 17a shear slices of ice cream from the front edge of the ribbon and carry the fruit and slices of ice cream into the lower chamber 25 where they are thoroughly stirred and mixed by means of the mixer 7 and forced out by the co-operation of the rotor 4 and scraper 19 into the discharge outlet 26.

In practice it has not been found necessary to maintain the volumetric capacity of the rotor 5 equal to or close to the volume of the ejected ribbon 18. In other words, it has not been found necessary to adjust the speed of the rotor 5 every time an adjustment is made which changes the speed of the flowing ribbon 18, except that the delivery capacity of the rotor 4 must be greater than the volume of ice cream and fruit supplied. In further explanation of the above, let it be assumed that the ribbon of ice cream 18 is supplied from a continuous pressure freezer, (such as shown, for example, in the patent to Godfrey and Farrall No. 2,210,366, dated August 6, 1940) the output of which may be varied so as to supply the ice cream anywhere within a range of from 60 gallons per hour to 190 gallons per hour. The vertical position of the motor 8 may be adjusted so that the rotor 4 will be driven at a speed which will take care of the maximum supply of ice cream and also the desired supply of fruit or the like from the hopper 3. When the machine is running at its full capacity of, say, 190 gallons per hour, the pockets in the rotor 4 may be substantially filled with the fruit and slices of ice cream. If now for any reason the rate of supply of ice cream is changed, say that, for example, only 75 gallons per hour of ice cream are being supplied, and assuming that the speed of the rotor 4 remains unchanged, the scraper 11 will be adjusted by means of the thumb nut 15 so that a smaller amount of fruit will be supplied from the pockets 2 to secure the proper proportion of ice cream and fruit. Due to this decrease in the supply of ice cream and fruit, the pockets 5 of the rotor 4 will not be completely filled with the slices of ice cream and fruit. In order to get rid of the resultant excess air in the pockets 5 due to the smaller amount of ice cream and fruit in the pockets, thus preventing the formation of relatively large bubbles in the ice cream, provision is made for the escape of some of this air by means of a groove 78 in the door or cover 31 which lies against the outer face of the rotor 4. It will be noted that when the door 31 is closed, the lower end of this groove 78 will be in communication with a pocket 5 in the rotor 4 after the pocket 5 has received its quota of ice cream and fruit, and that the excess of air in this pocket will be forced to escape through the groove in the cover due to the back pressure created by the resistance to flow of the mixture in the stirring chamber 25.

It has also been found helpful in getting rid of the excess air in the pockets 5 to design the guide 6, which controls the supply of ice cream to the rotor 4, in such a manner that the width of the ribbon of ice cream supplied to the rotor will be somewhat less than the width or thickness of the rotor itself. As shown in Fig. 1, the passage 78a for the ice cream in the guide 6 is somewhat narrower than the thickness or width of the rotor 4 so that there is a narrow space between the ribbon of ice cream supplied and the sides of the rotor casing, as shown at 78b, through which the excess air in the pockets 5 may escape upwardly.

An additional adjustment may be desirable for accurately controlling the supply of fruit or the like to the chute 17. The construction shown for this purpose comprises a slide or shutter 79 for controlling the size of the outlet from the rotor 1.

Figure 2:
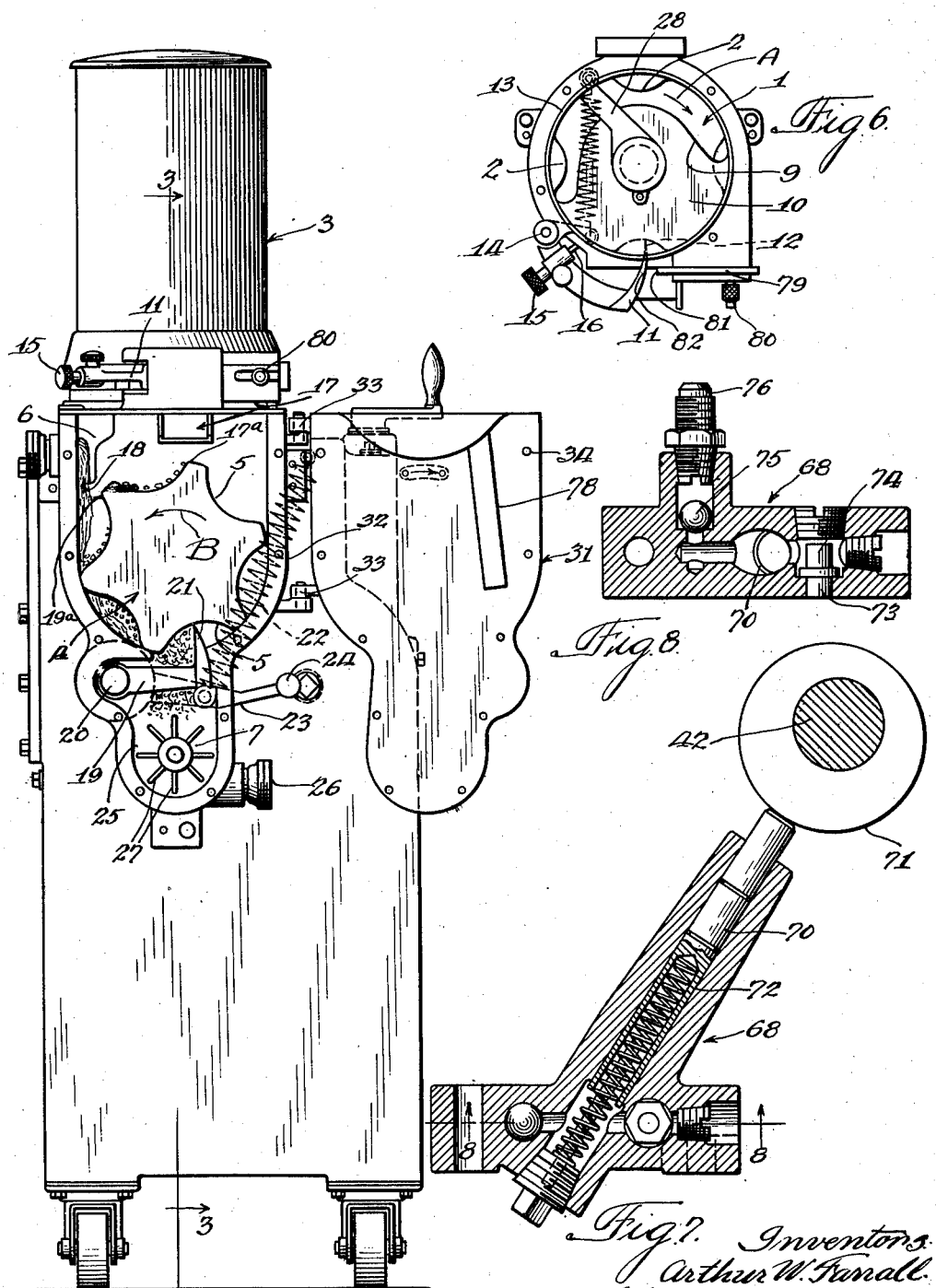
Fig. 2 is an elevational view taken from the left of Fig. 1.
Figure 3:
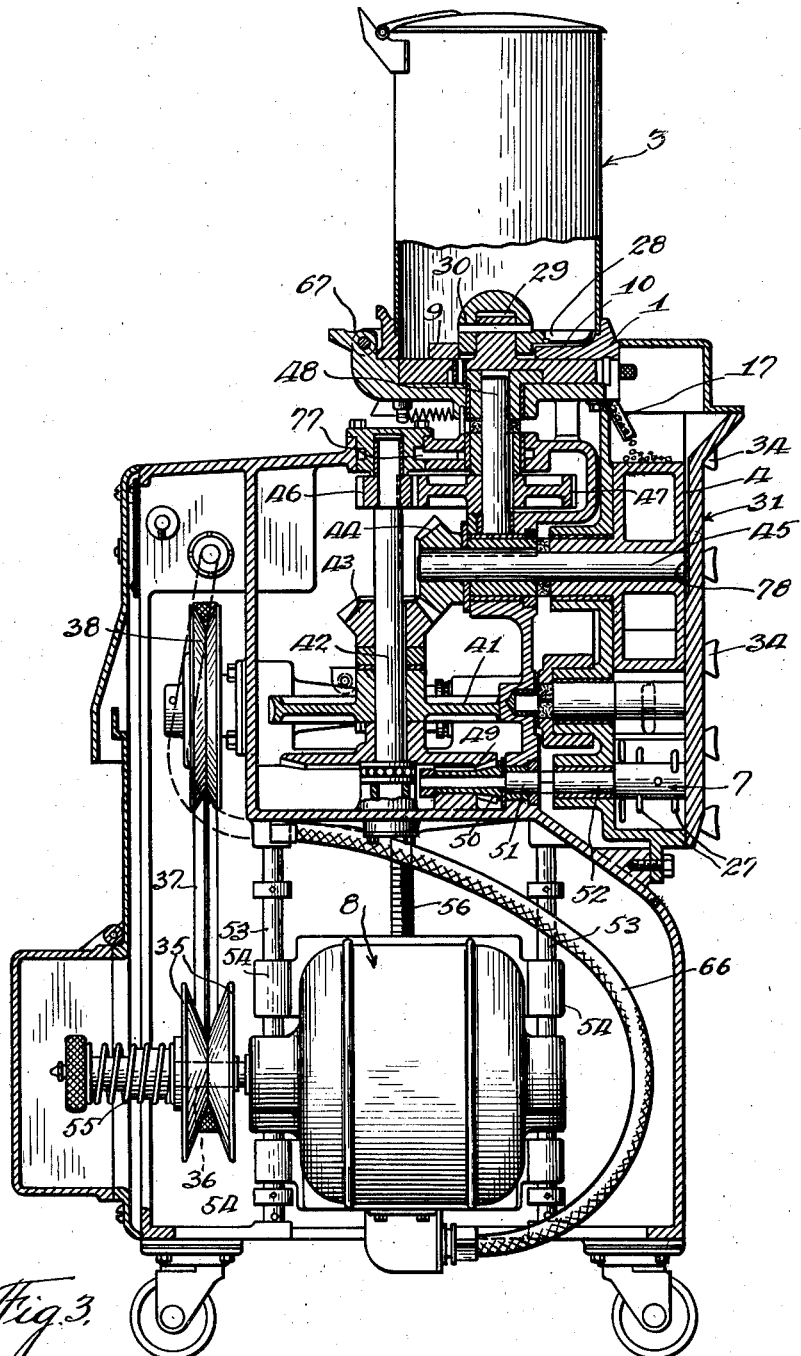
Fig. 3 is a vertical axial sectional view substantially on the line 3—3 of Fig. 2.

Referring to Figs. 1, 2, and 6, this shutter 79 may be shifted by means of the button 80 to vary the effective area of the opening between the left-hand edge 81 of the shutter and the curved surface 82 of the scraper 11. The shutter is normally left about two-thirds open, but with very juicy or soft fruits it may be necessary to reduce the size of this opening, as otherwise the greater part of the material might flow out from the pockets 2 regardless of the position of the scraper edge 12.

All parts of the apparatus that come in contact with the ice cream and fruit can be readily washed and brushed. The hopper 3 and fruit-metering rotor 1 may be removed from the top of the apparatus. The mixing chamber containing the rotor 4 and stirrer 7 is readily accessible simply by opening the hinged door or cover 31. The rotor 4 and stirrer 7 may then be readily removed for cleaning and the like by merely sliding them out of their positions.

Further modifications will be apparent to those skilled in the art, and it is desired, therefore, that the invention be limited only by the prior art and the scope of the appended claims.

Having thus described our invention, what we claim and desire to secure by Letters Patent is:

1. Apparatus for collecting and feeding separable bodies of edible material and edible plastic material comprising a rotor having a plurality of circumferentially spaced pockets, means for supplying said separable bodies to said pockets as the rotor revolves, means for supplying said edible plastic material to said pockets as the rotor revolves, and means past which the pockets move successively for entering said pockets and removing the collected edible material from said pockets as the rotor revolves.

2. Apparatus for collecting and feeding separable bodies of edible material and plastic edible material comprising a feed rotor for said separable bodies rotatable about a substantially vertical axis and having circumferentially spaced peripherally opening measuring pockets, a reservoir for supplying bodies of edible material to the pockets in said rotor, a cut-off plate underneath which said pockets travel, a scraper blade for removing the material from said pockets impelled toward the axis of said rotor and engaging the periphery of the rotor, a second rotor rotatable about a substantially horizontal axis having circumferentially spaced peripherally opening pockets to which charges of said edible bodies are delivered from said first rotor, means for supplying plastic material to the pockets of said second rotor as the rotor revolves, and means for removing the collected edible material from said pockets as the second rotor revolves.

3. Apparatus for collecting and feeding separable bodies of edible material and edible plastic material comprising a rotor having a plurality of circumferentially spaced pockets, means for supplying said separable bodies to said pockets at substantially atmospheric pressure as the rotor revolves, means for thereafter supplying said edible plastic material to said pockets at substantially atmospheric pressure as the rotor revolves, and means for removing the collected edible material from said pockets as the rotor revolves comprising a scraper past which the pockets move successively in rotation impelled toward the walls of the pockets.

4. A material feeding apparatus comprising a rotor having a plurality of circumferentially spaced pockets, means for supplying material to said pockets as the rotor revolves, a confining wall engaged by the edges of the pockets during a portion of their travel for confining the material in the pockets, means for removing the material from the pockets after the pockets have moved out of closing relation with respect to the confining wall comprising a scraper engageable with the walls of the pockets, means impelling the scaper toward the walls of the pockets, and means for controlling the amount of material removed from each pocket by the scraper comprising an adjustable stop for limiting the impelled movement of the scraper toward the walls of the pockets.

5. Apparatus for collecting and feeding separable bodies of edible material and plastic edible material comprising a feed rotor for said separable bodies rotatable about a substantially vertical axis and having circumferentially spaced peripherally opening measuring pockets, a reservoir for supplying bodies of edible material to the pockets in said rotor, a cut-off plate underneath which said pockets travel, a scraper blade for removing the material from said pockets impelled toward the axis of said rotor and engaging the periphery of the rotor, a second rotor rotatable about a substantially horizontal axis having circumferentially spaced peripherally opening pockets to which charges of said edible bodies are delivered from said first rotor, means for supplying plastic material to the pockets of said second rotor as the rotor revolves, and means for removing the collected edible material from said pockets as the second rotor revolves comprising a second scraper blade biased toward the axis of the second rotor.

6. Apparatus for collecting and feeding separable bodies of edible material and edible plastic material comprising a rotor having a plurality of circumferentially spaced pockets, means for supplying said separable bodies to said pockets as the rotor revolves, means for supplying said edible plastic material to said pockets as the rotor revolves, a confining wall in close juxtaposition with the edges of the pockets during a portion of their travel for confining the material in the pockets, an outlet to which the material from said pockets is delivered, and means for removing the collected material from the pockets after the pockets have moved out of closing relation with respect to the confining wall, said removing means cooperating with the rotor for forcing the removed material through said outlet, said apparatus having an air escape passage in communication with the pockets of the rotor when in material-confining position to enable the escape of air from said pockets under the back pressure due to forcing the material through the outlet.

7. Apparatus for collecting and feeding separable bodies of edible material and plastic edible material comprising a feed rotor for said separable bodies having circumferentially spaced peripherally opening measuring pockets, a reservoir for supplying bodies of edible material to the pockets in said rotor, a cut-off plate underneath which said pockets travel, a scraper blade for removing the material from said pockets impelled toward the axis of said rotor and engaging the periphery of the rotor, a second rotor having circumferentially spaced peripherally opening pockets to which charges of said edible bodies are delivered from said first rotor, means for supplying plastic material to the pockets of said second rotor as the rotor revolves, and means for removing the collected edible material from said pockets as the second rotor revolves.

8. Apparatus for collecting and feeding separable bodies of edible material and plastic edible material comprising a feed rotor for said separable bodies having circumferentially spaced peripherally opening measuring pockets, a reservoir for supplying bodies of edible material to the pockets in said rotor, a cut-off plate underneath which said pockets travel, a scraper blade for removing the material from said pockets impelled toward the axis of said rotor and engaging the periphery of the rotor, a second rotor having circumferentially spaced peripherally opening pockets to which charges of said edible bodies are delivered from said first rotor, means for supplying plastic material to the pockets of said second rotor as the rotor revolves, and means for removing the collected edible material from said pockets as the second rotor revolves comprising a second scraper blade impelled toward the axis of the second rotor.

9. Apparatus for collecting and feeding separable bodies of edible material and edible plastic material comprising a rotor having a plurality of circumferentially spaced pockets, means for supplying said separable bodies to said pockets as the rotor revolves, means for supplying said edible plastic material to said pockets as the rotor revolves, a confining wall in close juxtaposition with the edges of the pockets during the portion of their travel for confining the material in the pockets, an outlet to which the material from said pockets is delivered, and means for removing the collected material from the pockets after the pockets have moved out of closing relation with respect to the confining wall, said removing means cooperating with the rotor for forcing the removed material through said outlet, and said apparatus having provisions for the escape of air from said pockets under the back pressure due to forcing the material through the outlet.

10. Apparatus for collecting and feeding edible plastic material and another edible material comprising a collecting chamber having a receiving portion under atmospheric pressure and a discharge opening, means for delivering a continuous stream of plastic material to the receiving portion of said chamber, means for delivering said other edible material to the receiving portion of said chamber, and means operating in said chamber for collecting the plastic edible material and the other edible material and positively forcing the collected material from said chamber through said discharge opening under superatmospheric pressure.

11. Apparatus for collecting and feeding edible plastic material and another edible material comprising a collecting chamber having a receiving portion under atmospheric pressure and a discharge opening, means for delivering a continuous stream of plastic material to the receiving portion of said chamber, means for delivering said other edible material to the receiving portion of said chamber, and means operating in said chamber for collecting the plastic edible material and the other edible material and positively forcing the collected material from said chamber through said discharge opening under superatmospheric pressure comprising a rotor having a plurality of circumferentially spaced pockets to which both the stream of plastic material and the other edible material are delivered at atmospheric pressure.

12. Apparatus for collecting and feeding edible plastic material and another edible material comprising a collecting chamber having a receiving portion under atmospheric pressure and a discharge opening, means for delivering a continuous stream of plastic material to the receiving portion of said chamber, means for delivering said other edible material to the receiving portion of said chamber, means operating in said chamber for collecting the plastic edible material and the other edible material and positively forcing the collected material from said chamber through said discharge opening under superatmospheric pressure comprising a rotor having a plurality of circumferentially spaced pockets to which both the stream of plastic material and the other edible material are delivered at atmospheric pressure, said collecting chamber having a confining wall sealing against the edges of said pockets, and means cooperating with said confining wall and pockets for entering said pockets and removing the collected material therefrom and forcing it through said discharge opening.

13. Apparatus for collecting and feeding edible plastic material and another edible material comprising a collecting chamber having a receiving portion under atmospheric pressure and a discharge opening, means for delivering a continuous stream of plastic material to the receiving portion of said chamber, means for delivering said other edible material to the receiving portion of said chamber, means operating in said chamber for collecting the plastic edible material and the other edible material and positively forcing the collected material from said chamber through said discharge opening under superatmospheric pressure, a stirring chamber to which the collected material is delivered from the collecting chamber, and a stirrer operating in said stirring chamber.

14. Apparatus for collecting and feeding separable bodies of edible material and edible plastic material comprising a rotor having a plurality of circumferentially spaced pockets, means for supplying measured charges of said separable bodies to said pockets as the rotor revolves, means for supplying said edible plastic material to said pockets as the rotor revolves, and means past which the pockets move successively for entering said pockets and removing the collected edible material from said pockets as the rotor revolves, the supply of separable bodies and plastic material to said pockets being at atmospheric pressure.

15. A method of combining edible materials which comprises extruding coherent plastic edible material through an orifice into the atmosphere, applying other edible material to the exposed surface of the plastic material and embedding it therein while said plastic material is moving in continuous coherent extruded formation, and thereafter agitating the plastic and other edible material to mix them.

16. A method of combining edible materials which comprises extruding coherent plastic edible material through an orifice into the atmosphere, applying other edible material to the exposed surface of the plastic material while moving in continuous coherent extruded formation, separating the extruded material into sections containing plastic material and other edible material, and thereafter agitating the combined materials to mix them.

17. Apparatus for combining edible materials comprising means for extruding coherent plastic edible material through an orifice into the atmosphere, means for applying other edible material to the exposed surface of the plastic material while moving in continuous coherent extruded formation, means for separating the extruded material into sections containing plastic material and other edible material, and means for agitating the combined materials to mix them.

18. Apparatus for combining edible materials comprising means for extruding coherent plastic edible material through an orifice into the atmosphere, means for applying other edible material to the exposed surface of the plastic material and embedding it therein while the plastic material is moving in continuous coherent extruded formation, and means for agitating the combined plastic and other edible material to mix them.

19. Apparatus for collecting and feeding edible plastic material and another edible material comprising a receptacle, an inlet passage leading thereto for the extrusion of the plastic material under a pressure head into said receptacle, an inlet passage leading thereto for the entrance of the other material, means for supplying the other edible material to said receptacle through said passage, an outlet passage leading from said receptacle for the discharge of the combined material, and ejector means for creating a pressure head on the combined materials to force them from said receptacle through said outlet passage.

20. Apparatus for collecting and feeding edible plastic material and another edible material comprising a receptacle, an inlet passage leading thereto for the extrusion of the plastic material under a pressure head into said receptacle, an inlet passage leading thereto for the entrance of the other material, means for supplying the other edible material to said receptacle through said passage, an outlet passage leading from said receptacle for the discharge of the combined material, and ejector means for creating a pressure head on the combined materials to force them from said receptacle through said outlet passage, said ejector means being inside the receptacle.

21. Apparatus for collecting and feeding edible plastic material and another edible material comprising a receptacle, an inlet passage leading thereto for the extrusion of the plastic material under a pressure head into said receptacle, an inlet passage leading thereto for the entrance of the other material, means for supplying the other edible material to said receptacle through said passage, an outlet passage leading from said receptacle for the discharge of the combined material, said receptacle having a receiving portion in free communication with the atmosphere into which receiving portion both said inlet passages open, and ejector means in said receptacle for creating a pressure head on the combined material to force it from said receptacle through said outlet passage.

22. Apparatus for collecting and feeding edible plastic material and another edible material comprising a receptacle, an inlet passage leading thereto for the extrusion of the plastic material under a pressure head into said receptacle, an inlet passage leading thereto for the entrance of the other material, means for supplying the other edible material to said receptacle through said passage, an outlet passage leading from said receptacle for the discharge of the combined material, said receptacle having a receiving portion in free communication with the atmosphere into which receiving portion both said inlet passages open, and ejector means in said receptacle for creating a pressure head on the combined material to force it from said receptacle through said outlet passage, said ejector means comprising a rotor having a plurality of circumferentially spaced pockets to which said other edible material is supplied and to which thereafter said plastic material is supplied as the pockets travel.

ARTHUR W. FARRALL.
RODNEY L. HANSON.